United States Patent
Chen et al.

(10) Patent No.: US 11,252,964 B2
(45) Date of Patent: *Feb. 22, 2022

(54) ANTIBACTERIAL TEXTILE AND METHOD FOR PREPARING THE SAME

(71) Applicant: Shenzhen University, Shenzhen (CN)

(72) Inventors: Shiguo Chen, Shenzhen (CN); Lingjun Yuan, Shenzhen (CN); Xingli Zhu, Shenzhen (CN); Shaojun Chen, Shenzhen (CN); Zaochuan Ge, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 406 days.

This patent is subject to a terminal disclaimer.

(21) Appl. No.: 15/674,546

(22) Filed: Aug. 11, 2017

(65) Prior Publication Data

US 2017/0339960 A1 Nov. 30, 2017

Related U.S. Application Data

(63) Continuation-in-part of application No. PCT/CN2015/072848, filed on Feb. 12, 2015.

(30) Foreign Application Priority Data

Feb. 12, 2015 (CN) .......................... 201580001138.6

(51) Int. Cl.
*A01N 47/40* (2006.01)
*A01N 25/34* (2006.01)
*D06M 15/00* (2006.01)
*D06M 13/463* (2006.01)
*D06M 13/477* (2006.01)

(52) U.S. Cl.
CPC ............. *A01N 47/40* (2013.01); *A01N 25/34* (2013.01); *D06M 13/463* (2013.01); *D06M 13/477* (2013.01); *D06M 15/00* (2013.01)

(58) Field of Classification Search
None
See application file for complete search history.

(56) References Cited

U.S. PATENT DOCUMENTS

| | | | | |
|---|---|---|---|---|
| 3,790,615 A | * | 2/1974 | Traber et al. ........... | A01N 47/22 558/234 |
| 8,623,843 B2 | | 1/2014 | Chen | |
| 2012/0232301 A1 | | 9/2012 | Chen et al. | |

FOREIGN PATENT DOCUMENTS

| | | | | |
|---|---|---|---|---|
| CN | 101760963 A | | 6/2010 | |
| CN | 105531258 A | * | 4/2016 | |
| JP | H0411073 A | | 1/1992 | |
| JP | 2012031400 A | | 2/2012 | |
| JP | 2012048224 A | | 3/2012 | |
| WO | WO-2009119690 A1 | * | 10/2009 | .......... C09D 143/04 |
| WO | 2016127352 A1 | | 2/2015 | |

OTHER PUBLICATIONS

Chen, S. et al. "Environmentally friendly antibacterial cotton textiles finished with siloxane sulfopropylbetaine" Applied Materials & Interfaces, 2011, 3, 1154-1162. (Year: 2011).*
Yuan, J. et al. "Improvement of blood compatibility on cellulose membrane surface by grafting betaines" Colloids and Surfaces B: Biointerfaces, 2003, 30, 147-155.*
Chen, S. et al. "Study of zwitterionic sulfopropylbetaine containing reactive siloxanes for application in antibacterial materials" Colloids and Surfaces B: Biointerfaces, 2011, 85, 323-329.*
Lindstedt et al. (Antimicrobial Agents and Chemotherapy, 1990, 1949-1954).*
Chen et al. (Small, 2016, 12, 26, 3516-3521 and supplemental information (separate document attached)).*
Ellzey et al. (Textile Research Journal, 1962, 1029-1033).*
Ye, Sang-Ho et al., Nonthrombogenic, Biodegradable Elastomeric Polyurethanes with Variable Sulfobetaine Content, ACS Applied Materials & Interfaces, 6(24): 22796-22806, 2014.
First Office Action in Chinese Application No. 201580001138.6 dated Apr. 5, 2017, 9 Pages.
Chen, Shiguo et al., Synthesis and characterization of siloxane sulfobetaine antimicrobial agents, Surface Science, 605: L25-L28, 2011.
Mi, Luo et al., Integrated antimicrobial and nonfouling zwitterionic polymers, Angewandte Chemie International Edition, 53(7): 1746-1754, 2014.
Galkina, Irina V. et al., Synthesis and Antimicrobial Activity of Carboxylate Phosphabetaines Derivatives with Alkyl Chains of Various Lengths, Journal Of Chemistry, https://doi.org/10.1155/2013/302937, Article ID 302937, 6 Pages, 2013.
Cao, Bin et al., Switchable Antimicrobial and Antifouling Hydrogels with Enhanced Mechanical Properties, Advanced Healthcare Materials, 2(8): 1096-1102, 2013.
Mi, Luo et al., Synchronizing nonfouling and antimicrobial properties in a zwitterionic hydrogel, Biomaterials, 33(35): 8928-8933, 2012.
International Search Report in PCT/CN2015/072848 dated Oct. 29, 2015, 6 Pages.
Written opinion in PCT/CN2015/072848 dated Oct. 29, 2015, 10 Pages.

* cited by examiner

*Primary Examiner* — Erin E Hirt
(74) *Attorney, Agent, or Firm* — Metis IP LLC

(57) ABSTRACT

A textile having a surface that is coated with a compound of formula I or formula II.

19 Claims, No Drawings

ANTIBACTERIAL TEXTILE AND METHOD FOR PREPARING THE SAME

CROSS-REFERENCE TO RELATED APPLICATIONS

This application is a continuation-in-part of International Patent Application No. PCT/CN2015/072848 with an international filing date of Feb. 12, 2015, designating the United States, now pending, and further claims foreign priority to Chinese Patent Application No. 201580001138.6 filed Feb. 12, 2015. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to an antibacterial and anti-fouling textile and a method for preparing the same.

Description of the Related Art

Antibacterial textiles are textiles treated with an antibacterial agent. Their antibacterial properties lead to corresponding benefits for users.

Conventional methods for manufacturing antibacterial textiles involve long and complex production processes, and expensive starting materials in the nature of antibacterial agents. In addition, the washability of the resulting textiles is poor, and the antibacterial effect thereof is not durable.

SUMMARY OF THE INVENTION

In view of the above-described problems, it is one objective of the invention to provide an antibacterial and antifouling textile and a method for preparing the same. The antibacterial performance and washability of the textile disclosed herein are greatly improved, meanwhile their antibacterial effect is durable. In addition, the method is easy to carry out, and is suitable for industrial production.

To achieve the above objective, in accordance with one embodiment of the invention, there is provided an antibacterial and antifouling textile, a surface of which being coated with an isocyanate-terminated betaine compound. The isocyanate-terminated betaine compound has the formula I or formula II:

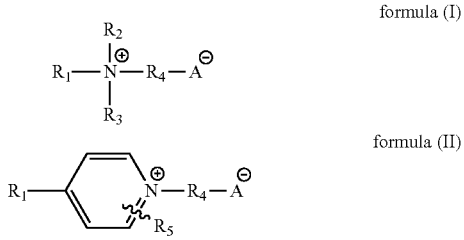

formula (I)

formula (II)

where, R represents OCN-L-NHCOO—R' or OCN-L-NHCONH—R'; OCN-L is a residue resulting from a reaction between diisocyanate compound and hydroxyl or amino; $R'=-(CH_2)_m$, where m is a positive integer greater than or equal to 1; or $R'=-(CH_2)_nO(CH_2)_y$, where n is a positive integer greater than or equal to 1, and y is a positive integer greater than or equal to 1; or $R'=-(CH_2)_mAr$, where m is a positive integer greater than or equal to 1; or $R'=-(CH_2)_nO(CH_2)_yAr$, where n is a positive integer greater than or equal to 1, and y is a positive integer greater than or equal to 1; and Ar is aryl.

$R_2$ represents $-(CH_2)_pCH_3$, where p is an integer between 1 and 17 (1, 2, 3, 4, 5, 6, 7, 8, 9, 10, 11, 12, 13, 14, 15, 16, or 17).

$R_3$ represents $-(CH_2)_pCH_3$, where p is an integer between 1 and 17 (1, 2, 3, 4, 5, 6, 7, 8, 9, 10, 11, 12, 13, 14, 15, 16, or 17).

$R_4$ represents $-(CH_2)_q$, where q is a positive integer greater than or equal to 1.

$R_5$ is a mono-substituent or a poly-substituent on a pyridine ring, and is any one selected from $-CH_3$, $-CH_2CH_3$, $-F$, $-Cl$, $-Br$, $-OMe$, $-CN$, or $-NO_2$.

A represents $-COO$, or $-SO_3$.

The isocyanate-terminated betaine compound contains a reactive functional group, i.e., isocyanate. The isocyanate is chemically bonded on the textile interface, and provides the textile with durable antibacterial activity and strong hydrophilicity.

In a class of this embodiment, $R'=-(CH_2)_m$, where m is an integer between 1 and 17; or $R'=-(CH_2)_nO(CH_2)_y$, where n is an integer between 1 and 17 (1, 2, 3, 4, 5, 6, 7, 8, 9, 10, 11, 12, 13, 14, 15, 16, or 17), and y is an integer between 1 and 17 (1, 2, 3, 4, 5, 6, 7, 8, 9, 10, 11, 12, 13, 14, 15, 16, or 17); or $R'=-(CH_2)_mAr$, where m is an integer between 1 and 17 (1, 2, 3, 4, 5, 6, 7, 8, 9, 10, 11, 12, 13, 14, 15, 16, or 17); or $R'=-(CH_2)_nO(CH_2)_yAr$, where n is an integer between 1 and 17 (1, 2, 3, 4, 5, 6, 7, 8, 9, 10, 11, 12, 13, 14, 15, 16, or 17), and y is an integer between 1 and 17 (1, 2, 3, 4, 5, 6, 7, 8, 9, 10, 11, 12, 13, 14, 15, 16, or 17); and Ar is aryl.

$R_2$ represents $-(CH_2)_pCH_3$, where p is an integer between 1 and 6.

$R_3$ represents $-(CH_2)_pCH_3$, where p is an integer between 1 and 6.

$R_4$ represents $-(CH_2)_q$, where q is an integer between 1 and 17.

In a class of this embodiment, $R'=-(CH_2)_m$, where m is an integer between 1 and 6; or $R'=-(CH_2)_nO(CH_2)_y$, where n is an integer between 1 and 6, and y is an integer between 1 and 6; or $R'=-(CH_2)_mAr$, where m is an integer between 1 and 6; or $R'=-(CH_2)-O(CH_2)_yAr$, where n is an integer between 1 and 6, and y is an integer between 1 and 6; and Ar is aryl.

$R_4$ represents $-(CH_2)_q$, where q is an integer between 1 and 6.

In a class of this embodiment, the diisocyanate compound is isophorone diisocyanate (IPDI), toluene diisocynate (TDI), diphenylmethane diisocyanate (MDI), 1, 5-naphthalene diisocyanate, tetramethyl diisocyanate, hexamethylene diisocyanate (HDI), p-phenyl diisocyanate, dimethylene phenyl diisocyanate, methylcyclohexane diisocyanate, or dicyclohexyl methane diisocyanate.

A method for preparing the antibacterial and antifouling textile, the method comprising:

1) soaking a raw textile in an antibacterial finishing solution containing an isocyanate-terminated betaine compound for between 10 s and 360 min; or brush coating or spray coating the raw textile with the antibacterial finishing solution containing the isocyanate-terminated betaine compound;
2) drying the textile obtained from 1) to yield an intermediate;
3) washing, shaping, and drying the intermediate to yield a final product.

In a class of this embodiment, in 1), the raw textile is soaked in the antibacterial finishing solution containing an isocyanate-terminated betaine compound for between 10 and 120 min.

In a class of this embodiment, the antibacterial finishing solution is evenly or unevenly brushed on the textile. The consumption of the antibacterial finishing solution in the brushing is adjusted according to actual needs in production. The antibacterial finishing solution is evenly or unevenly sprayed on the textile. The consumption of the antibacterial finishing solution in the spraying is adjusted according to actual needs in production.

In a class of this embodiment, optionally, the textile obtained in 2) is once again soaked in the antibacterial finishing solution for between 10 s and 360 min, and the textile is once again dried, washed, shaped and dried to yield the final product; or the textile obtained in 2) is once again coated with the antibacterial finishing solution, and the textile is once again dried, washed, shaped and dried to yield the final product.

In a class of this embodiment, the drying in 2) is performed at a temperature lower than 120° C.

In a class of this embodiment, the antibacterial finishing solution comprises:
between 0.5 and 20 wt. % of the isocyanate-terminated betaine compound; and
between 80 and 99.5 wt. % of a solvent.

In a class of this embodiment, the solvent is ethyl acetate, butyl acetate, chloroform, dichloromethane, tetrahydrofuran, acetone, butanone, ethyl alcohol, n-propanol, n-butanol, dimethylformamide, dimethylacetamide, dimethyl sulfoxide, or a mixture thereof.

In a class of this embodiment, a first synthesis route (1) of the isocyanate-terminated betaine compound and a method for preparing the same are as follows:

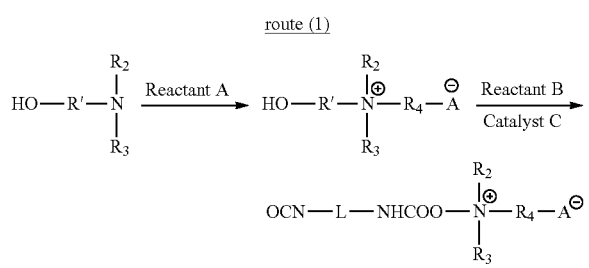

1) stirring hydroxyl-terminated tertiary amine and a reactant A and reacting for between 1 and 48 hr(s) at a temperature between 10 and 80° C. to yield a first white precipitate;
2) filtering or centrifugalizing to purify the first white precipitate to yield an intermediate product: hydroxyl-terminated betaine compound;
3) adding a reactant B in the hydroxyl-terminated betaine compound to form a reaction mixture; stirring the reaction mixture and reacting in the presence of catalyst C for between 1 and 48 hr(s) at a temperature between 10 and 80° C. to yield a second white precipitate; and
4) filtering or centrifugalizing to purify the second white precipitate to yield a target product: the isocyanate-terminated betaine compound.

In a class of this embodiment, a second synthesis route (2) of the isocyanate-terminated betaine compound and a method for preparing the same are as follows:

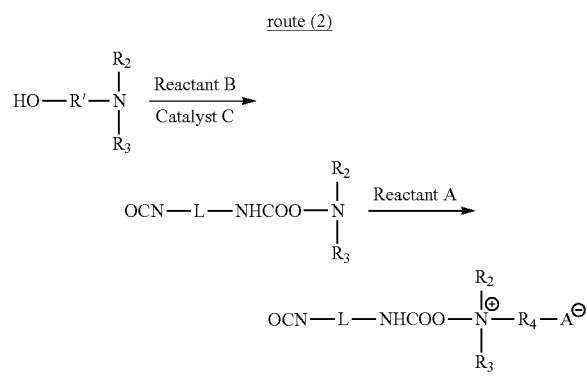

1) stirring hydroxyl-terminated tertiary amine and a reactant B and reacting in the presence of a catalyst C for between 0.5 and 48 hr(s) at a temperature between 10 and 90° C. to yield isocyanate-terminated tertiary amine; a preferable reacting time being 1 hr, 2 hrs, 4 hrs, 6 hrs, 8 hrs, 10 hrs, 24 hrs, and 48 hrs;
2) adding a reactant A in the isocyanate-terminated tertiary amine;
stirring and reacting for between 1 and 48 hr(s) at temperature between 10 and 80° C. to yield a white precipitate; a preferable reacting time being 1 hr, 2 hrs, 3 hrs, 4 hrs, 6 hrs, 10 hrs, 24 hrs, and 48 hrs; and
3) filtering or centrifugalizing to purify the white precipitate to yield a target product: the isocyanate-terminated betaine compound.

In a class of this embodiment, a third synthesis route (3) of the isocyanate-terminated betaine compound and a method for preparing the same are as follows:

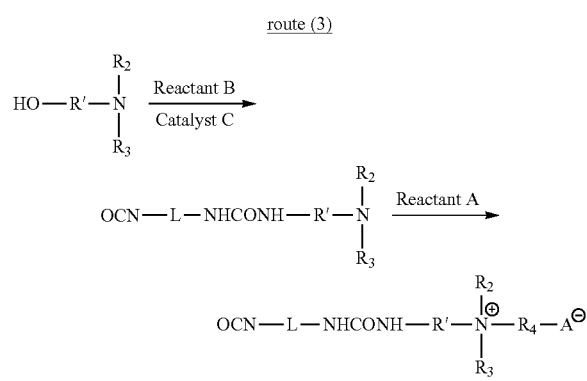

1) adding amine-terminated tertiary amine dropwise in a reactant B while stirring, and reacting for between 0.5 and 48 hr(s) at a temperature between 10 and 90° C. to yield isocyanate-terminated tertiary amine; a preferable reacting time being 1 hr, 2 hrs, 4 hrs, 6 hrs, 8 hrs, 10 hrs, 24 hrs, and 48 hrs;
2) adding a reactant A in the isocyanate-terminated tertiary amine; stirring and reacting for between 1 and 48 hr(s) at temperature between 10 and 80° C. to yield a white precipitate; a preferable reacting time being 1 hr, 2 hrs, 3 hrs, 4 hrs, 6 hrs, 10 hrs, 24 hrs, and 48 hrs; and 3) filtering or centrifugalizing to purify the white precipitate to yield a target product: the isocyanate-terminated betaine compound.

In a class of this embodiment, a fourth synthesis route (4) of the isocyanate-terminated betaine compound and a method for preparing the same are as follows:

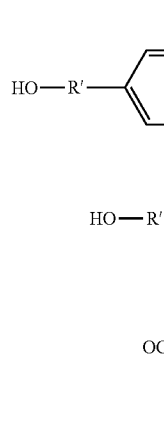

1) stirring hydroxyl-terminated tertiary amine and a reactant A and reacting for between 1 and 48 hr(s) at a temperature between 10 and 80° C. to yield a first white precipitate;
2) filtering or centrifugalizing to purify the first white precipitate to yield an intermediate product: hydroxyl-terminated betaine compound;
3) adding a reactant B in the hydroxyl-terminated betaine compound to form a reaction mixture; stirring the reaction mixture and reacting in the presence of catalyst C for between 1 and 48 hr(s) at a temperature between 10 and 80° C. to yield a second white precipitate; and
4) filtering or centrifugalizing to purify the second white precipitate to yield a target product: the isocyanate-terminated betaine compound.

In a class of this embodiment, a fifth synthesis route (5) of the isocyanate-terminated betaine compound and a method for preparing the same are as follows:

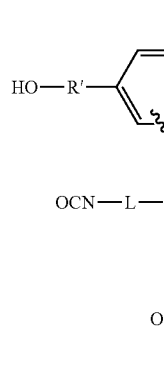

1) adding hydroxyl-terminated tertiary amine dropwise in a reactant B while stirring, and reacting for between 0.5 and 48 hr(s) at a temperature between 10 and 90° C. to yield isocyanate-terminated tertiary amine; a preferable reacting time being 1 hr, 2 hrs, 4 hrs, 6 hrs, 8 hrs, 10 hrs, 24 hrs, and 48 hrs;
2) adding a reactant A in the isocyanate-terminated tertiary amine; stirring and reacting for between 1 and 48 hr(s) at temperature between 10 and 80° C. to yield a white precipitate; a preferable reacting time being 1 hr, 2 hrs, 3 hrs, 4 hrs, 6 hrs, 10 hrs, 24 hrs, and 48 hrs; and
3) filtering or centrifugalizing to purify the white precipitate to yield a target product: the isocyanate-terminated betaine compound.

In a class of this embodiment, a sixth synthesis route (6) of the isocyanate-terminated betaine compound and a method for preparing the same are as follows:

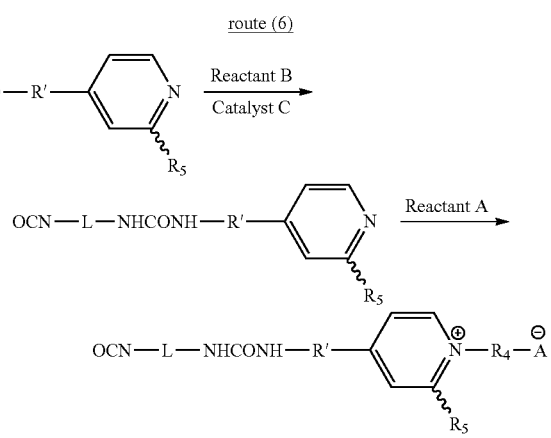

1) adding amine-terminated tertiary amine dropwise in a reactant B while stirring, and reacting for between 0.5 and 48 hr(s) at a temperature between 10 and 90° C. to yield isocyanate-terminated tertiary amine; a preferable reacting time being 1 hr, 2 hrs, 4 hrs, 6 hrs, 8 hrs, 10 hrs, 24 hrs, and 48 hrs;
2) adding a reactant A in the isocyanate-terminated tertiary amine; stirring and reacting for between 1 and 48 hr(s) at temperature between 10 and 80° C. to yield a white precipitate; a preferable reacting time being 1 hr, 2 hrs, 3 hrs, 4 hrs, 6 hrs, 10 hrs, 24 hrs, and 48 hrs; and
3) filtering or centrifugalizing to purify the white precipitate to yield a target product: the isocyanate-terminated betaine compound.

The reactant A in the synthesis routes (1)-(6) is selected from propane sultone, butane sultone, β-propiolactone, $X(CH_2)_vSO_3^-$, or $X(CH_2)_vCO_2^-$, and X is Br, Cl, or I, v is a positive integer greater than or equal to 1.

The reactant B in the synthesis routes (1)-(6) is a diisocyanate compound selected from isophorone diisocyanate (IPDI), toluene diisocynate (TDI), diphenylmethane diisocyanate (MDI), 1, 5-naphthalene diisocyanate, tetramethyl diisocyanate, hexamethylene diisocyanate (HDI), p-phenyl diisocyanate, dimethylene phenyl diisocyanate, methylcyclohexane diisocyanate, dicyclohexyl methane diisocyanate, or a mixture thereof.

Advantages of the antibacterial textile and the method according to embodiments of the invention are summarized as follows:

1. The betaine compound containing a reactive functional group-isocyanate group is chemically bonded on the surface of textile, and the strong bonding provides the textile with durable antibacterial activity, washability, and strong hydrophilicity.

2. The antibacterial textile is safe and practical, because the antibacterial solution is an insoluble antibacterial solution which can be immobilized, and does no harm to the resident flora on human skin (which is the shield against the attack from harmful microbe).

3. The method is easy and convenient to operate and control, and is applicable for industrial production.

DETAILED DESCRIPTION OF THE EMBODIMENTS

For further illustrating the invention, experiments detailing an anti-fouling and antibacterial textile and a method for preparing the same are described below. It should be noted that the following examples are intended to describe and not to limit the invention.

Example 1

Preparation of Lasting Antibacterial and Anti-Fouling Textile

S1: Textile was soaked in an antibacterial finishing solution containing an isocyanate-terminated betaine compound for 10 min.

S2: The textile processed in S1 was dried at 120° C. to yield an intermediate.

S3: The intermediate obtained in S2 was washed and shaped, then the intermediate was dried to yield the lasting antibacterial and anti-fouling textile.

The antibacterial finishing solution comprises: 20 wt. % of the isocyanate-terminated betaine compound, and between 80 wt. % of ethyl alcohol.

A structure of the isocyanate-terminated betaine compound is:

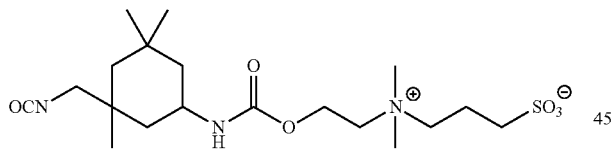

A method for preparing the isocyanate-terminated betaine compound is as follows: 44.6 g of isophorone diisocyanate (IPDI) was added in a mechanically agitated round-bottom flask. 0.2 mL of catalyst dibutyltin dilaurate was added in the IPDI, and 17.8 g of dimethylethanolamine (HO CH$_2$CH$_2$N (CH$_3$)$_2$) was added dropwise in the IPDI while stirring at 30° C. using a dropping funnel to form a reaction mixture. The reaction mixture reacted for 1 hr, and then was stirred to react for 12 hrs at 30° C. 24.4 g of propane sultone

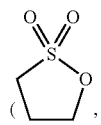

hereafter referred to as 1,3-PS) which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 2

Preparation of Lasting Antibacterial and Anti-Fouling Textile

S1: Textile was soaked in an antibacterial finishing solution containing an isocyanate-terminated betaine compound for 30 min.

S2: The textile processed in S1 was dried at 100° C. to yield an intermediate.

S3: The intermediate obtained in S2 was washed and shaped, then the intermediate was dried to yield the lasting antibacterial and anti-fouling textile.

The antibacterial finishing solution comprises: 15 wt. % of the isocyanate-terminated betaine compound, and between 85 wt. % of ethyl alcohol.

A structure of the isocyanate-terminated betaine compound is:

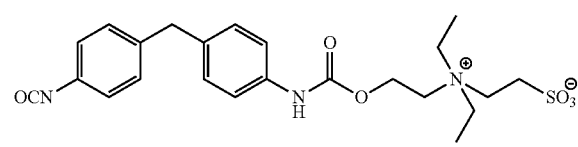

A method for preparing the isocyanate-terminated betaine compound is as follows:

44.6 g of diphenylmethane diisocyanate (MDI) was added in a mechanically agitated round-bottom flask. 0.2 mL of catalyst dibutyltin dilaurate was added in the MDI, and 20.6 of diethyl ethanolamine (HO CH$_2$CH$_2$N(CH$_2$CH$_3$)$_2$) was added dropwise in the MDI while stirring at 30° C. using a dropping funnel to form a reaction mixture. The reaction mixture reacted for 1 hr, and then was stirred to react for 12 hrs at 30° C. 24.4 g of propane sultone

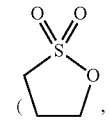

hereafter referred to as 1,3-PS) which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 3

Preparation of Lasting Antibacterial and Anti-Fouling Textile

S1: Textile was soaked in an antibacterial finishing solution containing an isocyanate-terminated betaine compound for 60 min.

S2: The textile processed in S1 was dried at 80° C. to yield an intermediate.

S3: The intermediate obtained in S2 was washed and shaped, then the intermediate was dried to yield the lasting antibacterial and anti-fouling textile.

The antibacterial finishing solution comprises: 10 wt. % of the isocyanate-terminated betaine compound, and between 90 wt. % of ethyl alcohol.

A structure of the isocyanate-terminated betaine compound is:

A method for preparing the isocyanate-terminated betaine compound is as follows:

44.6 g of hexamethylene diisocyanate (HDI) was added in a mechanically agitated round-bottom flask. 0.2 mL of catalyst stannous octoate was added in the HDI, and 17.8 g of N,N-dimethylaminoethanol (HO $CH_2CH_2N(CH_3)_2$) was added dropwise in the HDI while stirring at 30° C. using a dropping funnel to form a reaction mixture. The reaction mixture reacted for 1 hr, and then was stirred to react for 12 hrs at 30° C. 93.2 g of sodium chloroacetate ($ClCH_2CO_2Na$) which was dissolved in 400 mL of anhydrous tetrahydrofuran was added dropwise in the reaction mixture and reacted for 24 hrs at 20° C. to yield a white precipitate. The white precipitate was centrifugalized several times to yield the isocyanate-terminated betaine compound.

Example 4

Preparation of Lasting Antibacterial and Anti-Fouling Textile

S1: Textile was soaked in an antibacterial finishing solution containing an isocyanate-terminated betaine compound for 120 min.

S2: The textile processed in S1 was dried at 60° C. to yield an intermediate.

S3: The intermediate obtained in S2 was washed and shaped, then the intermediate was dried to yield the lasting antibacterial and anti-fouling textile.

The antibacterial finishing solution comprises: 5 wt. % of the isocyanate-terminated betaine compound, and between 95 wt. % of ethyl alcohol.

A structure of the isocyanate-terminated betaine compound is:

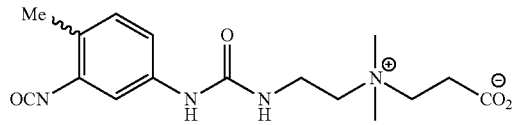

A method for preparing the isocyanate-terminated betaine compound is as follows:

44.6 g of 2,6-toluene diisocynate (TDI) was added in a mechanically agitated round-bottom flask. 0.2 mL of catalyst dibutyltin dilaurate was added in the TDI, and 17.8 g of dimethylaminoethanol (HO $CH_2CH_2N(CH_3)_2$) was added dropwise in the TDI while stirring at 30° C. using a dropping funnel to form a reaction mixture. The reaction mixture reacted for 1 hr, and then was stirred to react for 12 hrs at 30° C. 14.4 g of β-propiolactone

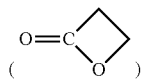

which was dissolved in 400 mL of butanone was added dropwise in the reaction mixture and reacted for 6 hrs at 40° C. to yield a white precipitate. The white precipitate was centrifugalized several times to yield the isocyanate-terminated betaine compound.

Example 5

Preparation of Lasting Antibacterial and Anti-Fouling Textile

S1: Textile was soaked in an antibacterial finishing solution containing an isocyanate-terminated betaine compound for 360 min.

S2: The textile processed in S1 was dried at 100° C. to yield an intermediate.

S3: The intermediate obtained in S2 was washed and shaped, then the intermediate was dried to yield the lasting antibacterial and anti-fouling textile.

The antibacterial finishing solution comprises: 0.5 wt. % of the isocyanate-terminated betaine compound, and between 99.5 wt. % of ethyl alcohol.

A structure of the isocyanate-terminated betaine compound is:

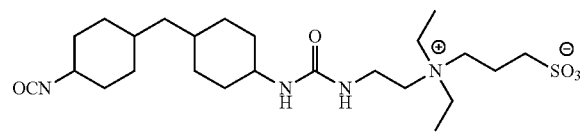

A method for preparing the isocyanate-terminated betaine compound is as follows:

44.6 g of dicyclohexyl methane diisocyanate (HMDI) was added in a mechanically agitated round-bottom flask. 0.2 mL of catalyst dibutyltin dilaurate was added in the HMDI, and 17.8 g of N,N-dimethylethylenediamine ($H_2NCH_2CH_2N(CH_3)_2$) was added dropwise in the HMDI while stirring at 30° C. using a dropping funnel to form a reaction mixture. The reaction mixture reacted for 1 hr, and then was stirred to react for 12 hrs at 30° C. 24.4 g of propane sultone

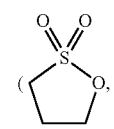

hereafter referred to as 1,3-PS) which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 6

Preparation of Lasting Antibacterial and Anti-Fouling Textile

S1: Textile was soaked in an antibacterial finishing solution containing an isocyanate-terminated betaine compound for 5 min.

S2: The textile processed in S1 was dried at 100° C. to yield an intermediate.

S3: The intermediate obtained in S2 was washed and shaped, then the intermediate was dried to yield the lasting antibacterial and anti-fouling textile.

The antibacterial finishing solution comprises: 20 wt. % of the isocyanate-terminated betaine compound, and between 80 wt. % of ethyl alcohol.

A structure of the isocyanate-terminated betaine compound is:

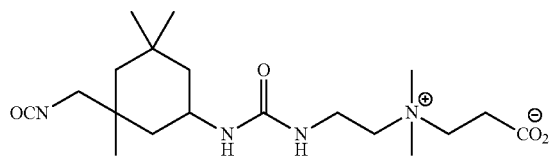

A method for preparing the isocyanate-terminated betaine compound is as follows:

44.6 g of isophorone diisocyanate (IPDI) was added in a mechanically agitated round-bottom flask. 0.2 mL of catalyst dibutyltin dilaurate was added in the IPDI, and 17.8 g of N,N-dimethylethylenediamine ($H_2NCH_2CH_2N(CH_3)_2$) was added dropwise in the IPDI while stirring at 30° C. using a dropping funnel to form a reaction mixture. The reaction mixture reacted for 1 hr, and then was stirred to react for 12 hrs at 30° C. 14.4 g of β-propiolactone

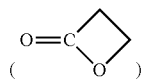

which was dissolved in 400 mL of butanone was added dropwise in the reaction mixture and reacted for 6 hrs at 40° C. to yield a white precipitate. The white precipitate was centrifugalized several times to yield the isocyanate-terminated betaine compound.

Example 7

Preparation of Lasting Antibacterial and Anti-Fouling Textile

S1: An antibacterial finishing solution was brushed on textile.

S2: The textile processed in S1 was dried at 80° C. to yield an intermediate.

S3: The intermediate obtained in S2 was washed and shaped, then the intermediate was dried to yield the lasting antibacterial and anti-fouling textile.

The antibacterial finishing solution comprises: 20 wt. % of the isocyanate-terminated betaine compound, and between 80 wt. % of ethyl alcohol.

A structure of the isocyanate-terminated betaine compound is:

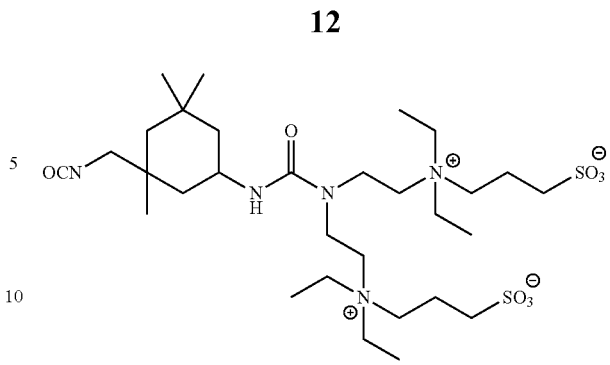

A method for preparing the isocyanate-terminated betaine compound is as follows:

44.6 g of isophorone diisocyanate (IPDI) was added in a mechanically agitated round-bottom flask. 0.2 mL of catalyst dibutyltin dilaurate was added in the IPDI, and 37.4 g of 3,3'-imino-bis(N,N-dimethylpropylamine) (($CH_3CH_2)_2CH_2CH_2NHCH_2CH_2N(CH_2CH_3)_2$) was added dropwise in the IPDI while stirring at 30° C. using a dropping funnel to form a reaction mixture. The reaction mixture reacted for 1 hr, and then was stirred to react for 12 hrs at 30° C. 48.8 g of propane sultone

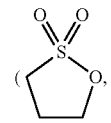

hereafter referred to as 1,3-PS) which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 8

Preparation of Lasting Antibacterial and Anti-Fouling Textile

S1: An antibacterial finishing solution was brushed on textile.

S2: The textile processed in S1 was dried at 60° C. to yield an intermediate.

S3: The intermediate obtained in S2 was washed and shaped, then the intermediate was dried to yield the lasting antibacterial and anti-fouling textile.

The antibacterial finishing solution comprises: 15 wt. % of the isocyanate-terminated betaine compound, and between 85 wt. % of ethyl alcohol.

A structure of the isocyanate-terminated betaine compound is:

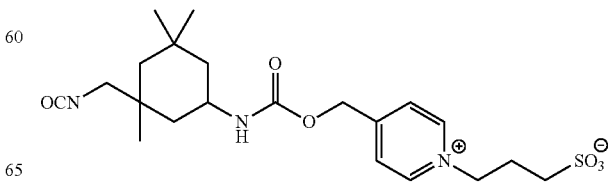

A method for preparing the isocyanate-terminated betaine compound is as follows:

44.6 g of isophorone diisocyanate (IPDI) was added in a mechanically agitated round-bottom flask. 0.2 mL of catalyst dibutyltin dilaurate was added in the IPDI, and 21.8 g of 4-pyridinemethanol was added dropwise in the IPDI while stirring at 30° C. using a dropping funnel to form a reaction mixture. The reaction mixture reacted for 1 hr, and then was stirred to react for 12 hrs at 30° C. 24.4 g of propane sultone

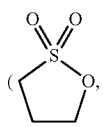

hereafter referred to as 1,3-PS) which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 9

Preparation of Lasting Antibacterial and Anti-Fouling Textile

S1: An antibacterial finishing solution was sprayed on textile, and the textile is moist.

S2: The textile processed in S1 was dried at room temperature to yield an intermediate.

S3: The intermediate obtained in S2 was washed and shaped, then the intermediate was dried to yield the lasting antibacterial and anti-fouling textile.

The antibacterial finishing solution comprises: 20 wt. % of the isocyanate-terminated betaine compound, and between 80 wt. % of ethyl alcohol.

A structure of the isocyanate-terminated betaine compound is:

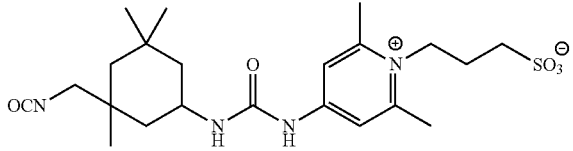

A method for preparing the isocyanate-terminated betaine compound is as follows:

44.6 g of isophorone diisocyanate (IPDI) was added in a mechanically agitated round-bottom flask. 0.2 mL of catalyst stannous octoate was added in the IPDI, and 24.4 g of 2,6-dimethyl-4-aminopyridine was added dropwise in the IPDI while stirring at 30° C. using a dropping funnel to form a reaction mixture. The reaction mixture reacted for 1 hr, and then was stirred to react for 12 hrs at 30° C. 24.4 g of propane sultone

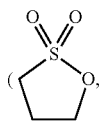

hereafter referred to as 1,3-PS) which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 10

Preparation of Lasting Antibacterial and Anti-Fouling Textile

S1: An antibacterial finishing solution was sprayed on textile, and the textile is moist.

S2: The textile processed in S1 was dried at room temperature to yield an intermediate.

S3: The intermediate obtained in S2 was washed and shaped, then the intermediate was dried to yield the lasting antibacterial and anti-fouling textile.

The antibacterial finishing solution comprises: 25 wt. % of the isocyanate-terminated betaine compound, and between 75 wt. % of ethyl alcohol.

A structure of the isocyanate-terminated betaine compound is:

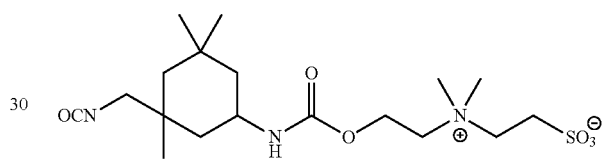

A method for preparing the isocyanate-terminated betaine compound is as follows:

44.6 g of isophorone diisocyanate (IPDI) was added in a mechanically agitated round-bottom flask. 0.2 mL of catalyst dibutyltin dilaurate was added in the IPDI, and 17.8 g of dimethyl ethanolamine (HO CH$_2$CH$_2$N(CH$_3$)$_2$) was added dropwise in the IPDI while stirring at 30° C. using a dropping funnel to form a reaction mixture. The reaction mixture reacted for 1 hr, and then was stirred to react for 12 hrs at 30° C. 42.2 g of 2-bromoethyl sodium sulfonate which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Example 11

Preparation of Lasting Antibacterial and Anti-Fouling Textile

S1: An antibacterial finishing solution was sprayed on textile, and the textile is moist.

S2: The textile processed in S1 was dried at room temperature to yield an intermediate.

S3: The intermediate obtained in S2 was washed and shaped, then the intermediate was dried to yield the lasting antibacterial and anti-fouling textile.

The antibacterial finishing solution comprises: 25 wt. % of the isocyanate-terminated betaine compound, and between 75 wt. % of ethyl alcohol.

A structure of the isocyanate-terminated betaine compound is:

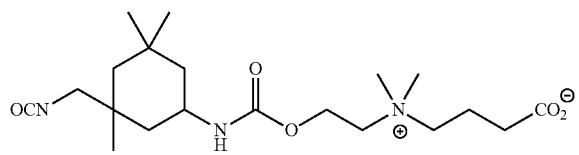

A method for preparing the isocyanate-terminated betaine compound is as follows:

44.6 g of isophorone diisocyanate (IPDI) was added in a mechanically agitated round-bottom flask. 0.2 mL of catalyst dibutyltin dilaurate was added in the IPDI, and 17.8 g of dimethyl ethanolamine (HO $CH_2CH_2N(CH_3)_2$) was added dropwise in the IPDI while stirring at 30° C. using a dropping funnel to form a reaction mixture. The reaction mixture reacted for 1 hr, and then was stirred to react for 12 hrs at 30° C. 37.4 g of 4-sodium bromobutyrate which was dissolved in 400 mL of anhydrous tetrahydrofuran was added dropwise in the reaction mixture and reacted for 1 hr to yield a white precipitate. The white precipitate was centrifugalized several times to yield the isocyanate-terminated betaine compound.

Antibacterial performance of the textile prepared in Examples 1-11 is tested according to the requirements and methods in the industrial standard FZ/T 73023-2006, and water content in the textile prepared in Examples 1-11 is tested according to the requirements and methods in the national standard GB/T 995-1997. Mechanical property of the textile prepared in Examples 1-11 is tested according to the requirements and methods in the national standard GB/T 3923.1-1997. Hydrophilicity of the textile prepared in Examples 1-11 is tested according to the requirements and methods in the industrial standard FZ/T01071-2008. Moisture permeability of the textile prepared in Examples 1-11 is tested according to the requirements and methods in the national standard GB/T12704.2-2009.

Test results are shown in Table 1 and Table 2. The test results indicate that indexes of the antibacterial and antifouling textile prepared in the examples of the invention meet the industry standard or national standard of textile, and a part of the indexes of the antibacterial and antifouling textile prepared in the examples are superior to those required in the industry standard or national standard of textile. For example, the antibacterial performance of the antibacterial and antifouling textile prepared in the examples of the invention is superior to that required in the industry standard; when the textile is washed the $50^{th}$ times, the bacteriostasis rate against Staphylococcus aureus (S. aureus), Escherichia coli (E. coli), and Candida albicans (C. albicans) is about 98%, which is well above that required in the industry standard; in addition, when the textile is washed the $100^{th}$ times, the bacteriostasis rate against Staphylococcus aureus (S. aureus), Escherichia coli (E. coli), and Candida albicans (C. albicans) is about 94%, which means that the antibacterial and antifouling textile prepared in the examples features lasting antibacterial activity and washability.

TABLE 1

Bacteriostasis rate and water content of the antibacterial textile

| | | Test basis | | | |
|---|---|---|---|---|---|
| | | Bacteriostasis rate (FZ/T 73023-2006) | | | GB/T 995-1997 |
| Example | Times of washing | S. aureus | E. coli | C. albicans | Water content |
| Example 1 | 50 | 97.91 | 97.69 | 95.74 | 8.6 |
| | 100 | 95.16 | 94.99 | 93.01 | 8.3 |
| Example 2 | 50 | 97.58 | 97.38 | 93.49 | 8.5 |
| | 100 | 95.25 | 95.30 | 92.12 | 8.4 |
| Example 3 | 50 | 97.90 | 97.43 | 95.36 | 8.9 |
| | 100 | 95.61 | 94.93 | 92.47 | 8.5 |
| Example 4 | 50 | 97.75 | 97.14 | 96.33 | 9.0 |
| | 100 | 95.61 | 95.60 | 93.11 | 8.5 |
| Example 5 | 50 | 97.00 | 96.37 | 94.99 | 8.7 |
| | 100 | 94.63 | 93.60 | 91.52 | 8.2 |
| Example 6 | 50 | 97.21 | 96.17 | 95.00 | 8.9 |
| | 100 | 95.32 | 94.30 | 92.32 | 8.4 |
| Example 7 | 50 | 98.86 | 97.62 | 96.49 | 9.8 |
| | 100 | 96.98 | 95.86 | 94.33 | 9.2 |
| Example 8 | 50 | 97.36 | 96.73 | 95.46 | 8.6 |
| | 100 | 95.68 | 94.10 | 91.78 | 8.1 |
| Example 9 | 50 | 97.42 | 96.78 | 96.06 | 8.8 |
| | 100 | 95.08 | 94.19 | 92.30 | 8.3 |
| Example 10 | 50 | 97.72 | 97.48 | 96.31 | 8.9 |
| | 100 | 95.21 | 95.08 | 93.16 | 8.6 |
| Example 11 | 50 | 97.61 | 97.13 | 96.43 | 8.8 |
| | 100 | 95.44 | 94.30 | 92.73 | 8.5 |

Note:
S. aureus: ATCC 6538;
E. coli: 8099;
C. albicans: ATCC 10231

TABLE 2

Mechanical property, hydrophilicity, moisture permeability of the antibacterial textile

| | | Test basis | | | | | | |
|---|---|---|---|---|---|---|---|---|
| | | GB/T 3923.1-1997 | | | | FZ/T01071-2008 Hydrophilicity | | GB/T12704.2-2009 |
| | | Fracture strength (N) | | Elongation at break (%) | | (core height: mm) | | Moisture permeability |
| Test item | | Transverse | Lengthwise | Transverse | Lengthwise | 0.5 h | 24 h | (g/m² · h) |
| Example 1 | Blank cloth | 265.00 | 586.20 | 67.98 | 32.87 | 65.00 | 110.00 | 188.27 |
| | Antibacterial cloth | 232.08 | 605.44 | 72.29 | 35.02 | 119.00 | 224.00 | 189.21 |

TABLE 2-continued

Mechanical property, hydrophilicity, moisture permeability of the antibacterial textile

| | | Test basis | | | | | | |
|---|---|---|---|---|---|---|---|---|
| | | GB/T 3923.1-1997 | | | | FZ/T01071-2008 Hydrophilicity | | GB/T12704.2-2009 |
| | | Fracture strength (N) | | Elongation at break (%) | | (core height: mm) | | Moisture permeability |
| Test item | | Transverse | Lengthwise | Transverse | Lengthwise | 0.5 h | 24 h | (g/m² · h) |
| Example 2 | Blank cloth | 265.00 | 586.20 | 67.98 | 32.87 | 65.00 | 110.00 | 188.27 |
| | Antibacterial cloth | 312.05 | 630.36 | 68.00 | 36.74 | 136.01 | 244.00 | 186.28 |
| Example 3 | Blank cloth | 265.00 | 586.20 | 67.98 | 32.87 | 65.00 | 110.00 | 188.27 |
| | Antibacterial cloth | 329.05 | 651.26 | 68.02 | 37.44 | 128.16 | 222.00 | 186.79 |
| Example 4 | Blank cloth | 265.00 | 586.20 | 67.98 | 32.87 | 65.00 | 110.00 | 188.27 |
| | Antibacterial cloth | 327.09 | 651.31 | 66.25 | 37.81 | 152.44 | 271.0 | 186.71 |
| Example 5 | Blank cloth | 265.00 | 586.20 | 67.98 | 32.87 | 65.00 | 110.00 | 188.27 |
| | Antibacterial cloth | 321.03 | 661.49 | 67.15 | 37.33 | 136.25 | 251.01 | 186.34 |
| Example 6 | Blank cloth | 265.00 | 586.20 | 67.98 | 32.87 | 65.00 | 110.00 | 188.27 |
| | Antibacterial cloth | 337.23 | 639.79 | 68.45 | 38.31 | 137.01 | 238.00 | 187.35 |
| Example 7 | Blank cloth | 265.00 | 586.20 | 67.98 | 32.87 | 65.00 | 110.00 | 188.27 |
| | Antibacterial cloth | 321.64 | 662.43 | 64.98 | 37.99 | 139.84 | 263.00 | 187.82 |
| Example 8 | Blank cloth | 265.00 | 586.20 | 67.98 | 32.87 | 65.00 | 110.00 | 188.27 |
| | Antibacterial cloth | 352.03 | 661.47 | 63.79 | 36.91 | 136.04 | 263.00 | 186.87 |
| Example 9 | Blank cloth | 265.00 | 586.20 | 67.98 | 32.87 | 65.00 | 110.00 | 188.27 |
| | Antibacterial cloth | 312.02 | 629.41 | 67.02 | 36.98 | 137.03 | 263.00 | 187.41 |
| Example 10 | Blank cloth | 265.00 | 586.20 | 67.98 | 32.87 | 65.00 | 110.00 | 188.27 |
| | Antibacterial cloth | 352.31 | 621.42 | 64.17 | 38.36 | 145.21 | 232.00 | 187.35 |
| Example 11 | Blank cloth | 265.00 | 586.20 | 67.98 | 32.87 | 65.00 | 110.00 | 188.27 |
| | Antibacterial cloth | 316.02 | 621.41 | 63.09 | 36.90 | 139.42 | 244.07 | 186.32 |

Note:
In the hydrophilicity test, the ambient humidity is 50%, and the temperature is 23° C.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An antibacterial textile comprising a surface being covalently modified by a compound having formula:

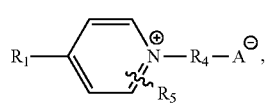

formula (II)

wherein $R_1$ represents OCN-L-NHCOO—R' or OCN-L-NHCONH—R'; wherein L is a diisocyanate compound excluding both isocyanate groups, the diisocyanate compound is one selected from the group consisting of: isophorone diisocyanate (IPDI), toluene diisocyanate (TDI), diphenylmethane diisocyanate (MDI), 1,5-naphthalene diisocyanate, tetramethyl diisocyanate, hexamethylene diisocyanate (HDI), p-phenyl diisocyanate, dimethylene phenyl diisocyanate, methylcyclohexane diisocyanate, and dicyclohexyl methane diisocyanate;

$R'=$—$(CH_2)_m$, and m is a positive integer between 1 and 17;

or $R'=$—$(CH_2)_nO(CH_2)_y$, and n is a positive integer between 1 and 17; y is a positive integer between 1 and 17;

or $R'=$—$(CH_2)_mAr$, and m is a positive integer between 1 and 17, and Ar is aryl;

or $R'=$—$(CH_2)_nO(CH_2)_yAr$, and n is a positive integer between 1 and 17; y is a positive integer between 1 and 17, and Ar is aryl;

$R_4$ represents —$(CH_2)_q$, and q is a positive integer between 1 and 17;

$R_5$ is a mono-substituent or a poly-substituent on a pyridine ring, and is any one selected from —$CH_3$, —$CH_2CH_3$, —F, —Cl, —Br, —OMe, —CN, or —$NO_2$; and A represents —COO, or —$SO_3$, wherein the modified textile is antibacterial and maintains at least 95% of its antibacterial properties after 50 washes.

2. The textile of claim 1, wherein $R'=$—$(CH_2)_m$, and m is an integer between 1 and 6;

or $R'=$—$(CH_2)_nO(CH_2)_y$, and n is an integer between 1 and 6; y is an integer between 1 and 6;

or R'=—(CH$_2$)$_m$Ar, and m is an integer between 1 and 6;
or R'=—(CH$_2$)$_n$O(CH$_2$)$_y$Ar, and n is an integer between 1 and 6; y is an integer between 1 and 6, and Ar is aryl;
and R$_4$ represents —(CH$_2$)$_q$, and q is an integer between 1 and 6.

3. A method for preparing the textile of claim 1, the method comprising:
   1) soaking a raw textile in an antibacterial finishing solution containing the compound having the formula of claim 1 for between 10 s and 360 min; or brush coating or spray coating the raw textile with the antibacterial finishing solution containing the compound having the formula of claim 1;
   2) drying the textile obtained from 1) to yield an intermediate; and
   3) washing, shaping, and drying the intermediate to yield the antibacterial textile of claim 1.

4. The method of claim 3, wherein in 1), the raw textile is soaked in the antibacterial finishing solution containing the compound having the formula of claim 1 for between 10 and 120 min.

5. The method of claim 3, wherein the textile obtained in 2) is once again soaked in the antibacterial finishing solution for between 10 s and 360 min, and the textile is once again dried, washed, shaped and dried to yield the antibacterial textile of claim 1; or the textile obtained in 2) is once again coated with the antibacterial finishing solution, and the textile is once again dried, washed, shaped and dried to yield the antibacterial textile of claim 1.

6. The method of claim 3, wherein the drying in 2) is performed at a temperature lower than 120° C.

7. The method of claim 3, wherein the antibacterial finishing solution comprises:
   between 0.5 and 20 wt. % of the compound having the formula of claim 1; and
   between 80 and 99.5 wt. % of a solvent.

8. The method of claim 4, wherein the antibacterial finishing solution comprises:
   between 0.5 and 20 wt. % of the compound having the formula of claim 1; and
   between 80 and 99.5 wt. % of a solvent.

9. The method of claim 5, wherein the antibacterial finishing solution comprises:
   between 0.5 and 20 wt. % of the compound having the formula of claim 1; and
   between 80 and 99.5 wt. % of a solvent.

10. The method of claim 6, wherein the antibacterial finishing solution comprises:
    between 0.5 and 20 wt. % of the compound having the formula of claim 1; and
    between 80 and 99.5 wt. % of a solvent.

11. The method of claim 7, wherein the solvent is ethyl acetate, butyl acetate, chloroform, dichloromethane, tetrahydrofuran, acetone, butanone, ethyl alcohol, n-propanol, n-butanol, dimethylformamide, dimethylacetamide, dimethyl sulfoxide, or a mixture thereof.

12. The method of claim 8, wherein the solvent is ethyl acetate, butyl acetate, chloroform, dichloromethane, tetrahydrofuran, acetone, butanone, ethyl alcohol, n-propanol, n-butanol, dimethylformamide, dimethylacetamide, dimethyl sulfoxide, or a mixture thereof.

13. The method of claim 9, wherein the solvent is ethyl acetate, butyl acetate, chloroform, dichloromethane, tetrahydrofuran, acetone, butanone, ethyl alcohol, n-propanol, n-butanol, dimethylformamide, dimethylacetamide, dimethyl sulfoxide, or a mixture thereof.

14. The method of claim 10, wherein the solvent is ethyl acetate, butyl acetate, chloroform, dichloromethane, tetrahydrofuran, acetone, butanone, ethyl alcohol, n-propanol, n-butanol, dimethylformamide, dimethylacetamide, dimethyl sulfoxide, or a mixture thereof.

15. The antibacterial textile of claim 1, wherein the compound has a formula of

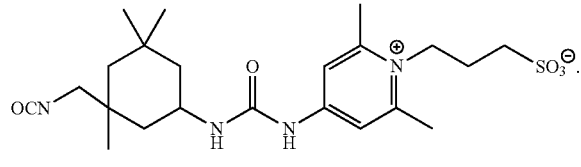

16. The textile of claim 1, wherein the textile maintains at least 90% of its antibacterial properties after 100 washes.

17. The textile of claim 1, wherein the textile has similar moisture permeability compared to the textile prior to the modification.

18. The textile of claim 1, wherein the textile has similar fracture strength compared to the textile prior to the modification.

19. The textile of claim 1, wherein the textile has similar elongation at break compared to the textile prior to the modification.

* * * * *